United States Patent
Huntsberger et al.

(10) Patent No.: US 6,522,244 B2
(45) Date of Patent: Feb. 18, 2003

(54) CHILDREN'S RIDE-ON VEHICLE WITH AUDIOVISUAL DEVICE

(75) Inventors: Kurt J. Huntsberger, Chaffee, NY (US); Daniel J. Damon, West Seneca, NY (US)

(73) Assignee: Mattel, Inc., El Segundo, CA (US)

( * ) Notice: Subject to any disclaimer, the term of this patent is extended or adjusted under 35 U.S.C. 154(b) by 44 days.

(21) Appl. No.: 09/780,106

(22) Filed: Feb. 8, 2001

(65) Prior Publication Data

US 2002/0104694 A1 Aug. 8, 2002

(51) Int. Cl.[7] ................................................. B60Q 1/00
(52) U.S. Cl. ................................ 340/425.5; 340/384.1; 340/384.4; 340/384.7; 280/828; 280/1.13; 280/1.16; 280/200
(58) Field of Search ......................... 340/425.5, 384.1, 340/384.4, 384.7; 280/828, 1.13, 1.16, 200

(56) References Cited

U.S. PATENT DOCUMENTS

| | | | |
|---|---|---|---|
| 3,945,337 A | 3/1976 | Sweetman | 116/36 |
| 4,280,300 A * | 7/1981 | Kulesza et al. | 46/204 |
| 4,515,393 A | 5/1985 | Sauter | 280/756 |
| 4,717,366 A | 1/1988 | Ishimoto | 446/470 |
| 4,813,907 A | 3/1989 | Rissman et al. | 446/175 |
| 4,987,403 A | 1/1991 | Apfel | 340/457 |
| 5,130,693 A | 7/1992 | Gigandet | 340/384 E |
| 5,409,263 A * | 4/1995 | Klawitter | 280/827 |
| 5,418,697 A | 5/1995 | Chiou | 362/72 |
| 5,635,903 A | 6/1997 | Koike et al. | 340/441 |
| 5,718,454 A * | 2/1998 | Harrod | 280/756 |
| D410,258 S | 5/1999 | Lerch | D21/433 |
| 5,931,524 A | 8/1999 | Jones, Jr. | 296/177 |
| 6,171,171 B1 * | 1/2001 | Barthold | 446/438 |
| 6,250,987 B1 | 6/2001 | Choi | 446/436 |
| 6,288,633 B1 * | 9/2001 | Volpe et al. | 340/384.1 |

* cited by examiner

*Primary Examiner*—Daniel J. Wu
*Assistant Examiner*—Tai T. Nguyen
(74) *Attorney, Agent, or Firm*—Kolisch Hartwell, P.C.

(57) ABSTRACT

A ride-on vehicle for children comprising a body with a seat, a plurality of wheels rotatably coupled to the body, a steering mechanism operable by a child seated on the seat, and a frame forming a portion of the body. The frame includes a plurality of interconnected frame members, with at least one of the frame members comprising an audio-visual device configured to emit at least one of a light and a sound upon the occurrence of a triggering event. The audio-visual device has opposing end regions that are connected to other frame members such that the audio-visual device forms a portion of the frame and maintains other frame members in a spaced-apart relationship. In some embodiments, the frame at least partially defines a riding space, and the audio-visual device is configured to be activated by a child seated within the riding space.

37 Claims, 5 Drawing Sheets

CHILDREN'S RIDE-ON VEHICLE WITH AUDIOVISUAL DEVICE

TECHNICAL FIELD

The present invention relates to a children's ride-on vehicle. More particularly, the present invention provides a children's ride-on vehicle that includes an audio-visual device configured to emit at least one of a light and a sound when activated.

BACKGROUND

Children's ride-on vehicles are toy vehicles designed to be ridden by a child. Ride-on vehicles typically include a body sized to accommodate and for use by a child, a plurality of wheels rotatably coupled to the body, a seat for the child to sit on, a motor and power supply to drive the wheels, and a steering mechanism operable from the seat so that the vehicle can be controlled by the child.

Children's ride-on vehicles are sometimes modeled after familiar or popular full-sized vehicles. These ride-on vehicles may include scaled-down versions of many of the features found on the full-sized vehicles. Other children's ride-on vehicles often resemble fantasy vehicles that do not have a corresponding full-sized counterpart. Sometimes children's ride-on vehicles include light and/or sound emitting devices to add to the child's enjoyment of using the vehicles. The term "audio-visual device", as used herein, refers to devices that emit either light, sound, or both light and sound. For example, ride-on vehicles that resemble law enforcement vehicles may include lights and/or sirens to more closely resemble full-sized law enforcement vehicles. These audio-visual devices are generally attached as an appendage to the hood or top of a ride-on vehicle. Thus, they tend to extend away from the body of the vehicle as an attached accessory, making them more vulnerable to damage or impact compared to other parts of the vehicle. Furthermore, they add to the materials and assembly required for the vehicle.

SUMMARY OF THE INVENTION

The present invention provides a ride-on vehicle for children comprising a body with a seat, a plurality of wheels rotatably coupled to the body, a steering mechanism operable by a child seated on the seat, and a frame forming a portion of the body. The frame includes a plurality of interconnected frame members, with at least one of the frame members comprising an audio-visual device configured to emit at least one of a light and a sound upon the occurrence of a triggering event. The audio-visual device has opposing end regions that are connected to other frame members such that the audio-visual device forms a portion of the frame and maintains other frame members in a spaced-apart relationship. In some embodiments, the frame at least partially defines a riding space, and the audio-visual device is configured to be activated by a child seated within the riding space.

DETAILED DESCRIPTION AND BEST MODE OF THE INVENTION

Figure 1:
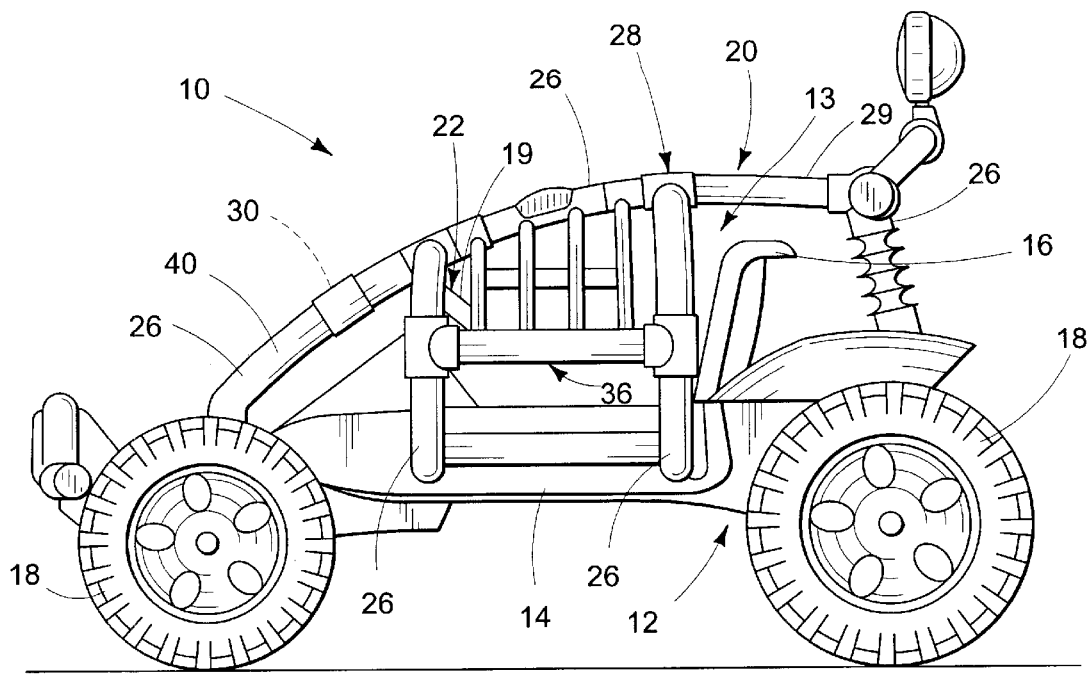
FIG. 1 is a side elevation view of a ride-on vehicle with an audio-visual device according to the present invention.
Figure 2:
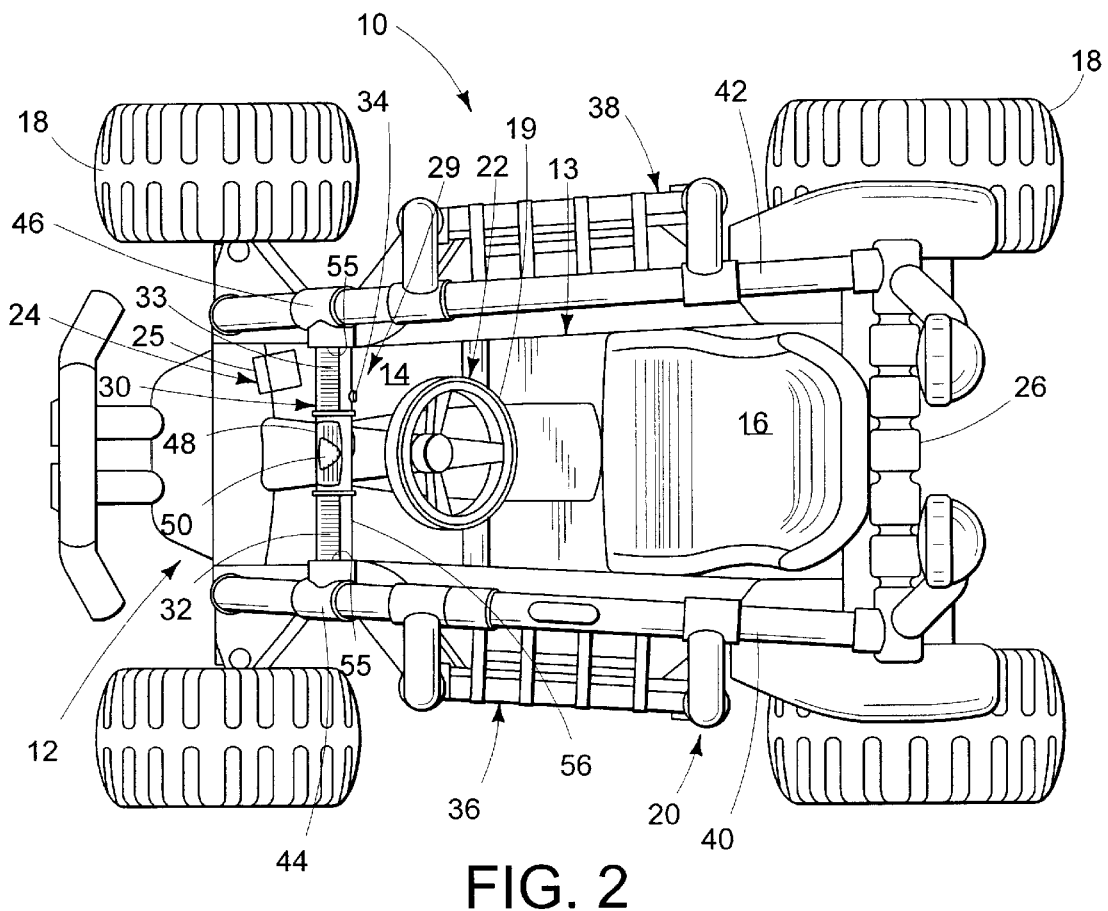
FIG. 2 is a top plan view of the vehicle and audio-visual device of FIG. 1.

A children's ride-on vehicle according to the present invention is shown in FIGS. 1 and 2 and generally indicated at 10. Vehicle 10 is adapted for use by a child, and therefore includes a plurality of scaled-down, or child-sized, structural parts, including a body 12 with a passenger region, or riding space 13, in which a child may sit to operate the vehicle, and a plurality of wheels 18 that are rotatably coupled to the body.

When vehicle 10 is designed to resemble a full-sized vehicle used by adults, the body, or at least portions thereof, may be designed to be similar in appearance to the corresponding portions of the full-sized vehicle. When the ride-on vehicle is designed to represent a fantasy vehicle that does not have a corresponding full-sized vehicle, it may still include portions that are designed to represent corresponding portions that are present on adult-sized vehicles. This partial or total resemblance to adult vehicles increases many children's enjoyment and fun when using vehicle 10.

As shown, body 12 includes a base 14 and a frame 20 extending generally upwardly from the base. Body 12 is often formed of molded plastic, although other suitable materials may be used. It should be understood that the body and at least a portion of the frame may be integrally formed or separately formed and then joined together. Body 12 further includes a seat 16 on which a child may sit, and a steering mechanism 22 and vehicle actuator 24 that a child may comfortably reach and operate when sitting on seat 16. As shown, steering mechanism 22 takes the form of a steering wheel 19 connected to one or more steerable wheels, and the vehicle actuator takes the form of a foot pedal 25. It should be understood that steering mechanism 22 and actuator 24 may have other suitable structures. For example, steering mechanism 22 may take the form of a handlebar, and actuator 24 may take the form of an on/off switch, throttle, lever or other switch adapted to be actuated by a child's hand. As discussed in more detail subsequently, body 12 also includes an audio-visual device 30 that is adapted to emit at least one of sound and audio and which forms a structural part of the body.

Ride-on vehicle 10 of the depicted embodiment takes the form of a scaled-down, or child-sized, dune buggy, though as discussed, it is within the scope of the invention that ride-on 10 may take other forms. In the illustrated embodiment, vehicle 10 includes a plurality of scaled-down structural parts configured to be similar in appearance to a plurality of corresponding structural parts of a full-sized dune buggy. For example, in the illustrated embodiment, frame 20 includes a plurality of interconnected frame members 26 that define a cage-like structure 28, described in more detail below, to simulate a roll-cage of a full-sized dune buggy.

Frame 20 also includes audio-visual device 30. Audio-visual device 30 is configured to emit at least one of a light and a sound upon the occurrence of a triggering event. Device 30 includes a triggering device 29 adapted to cause device 30 to emit light and/or sound. Triggering device 29, which may also be referred to as a user input device, is configured to cause audio-visual device 30 to emit one of a light and a sound upon the occurrence of a triggering event. The triggering device may thus include any suitable mechanism for causing the emission of the light and/or the sound upon the occurrence of this event. For example, the triggering device may include a switch configured to trigger the emission of a light and/or sound when ride-on vehicle 10 undergoes sudden changes in direction or speed. Examples of suitable switches are motion-sensitive switches, contact switches associated with the vehicle's actuation device 24 and switches associated with speed and/or rotation sensors in communication with the vehicle's drive assembly. Another suitable switch is a switch that is not directly linked to the operation of the vehicle, and instead is positioned for manual actuation by a child sitting on seat 16.

Figure 3:
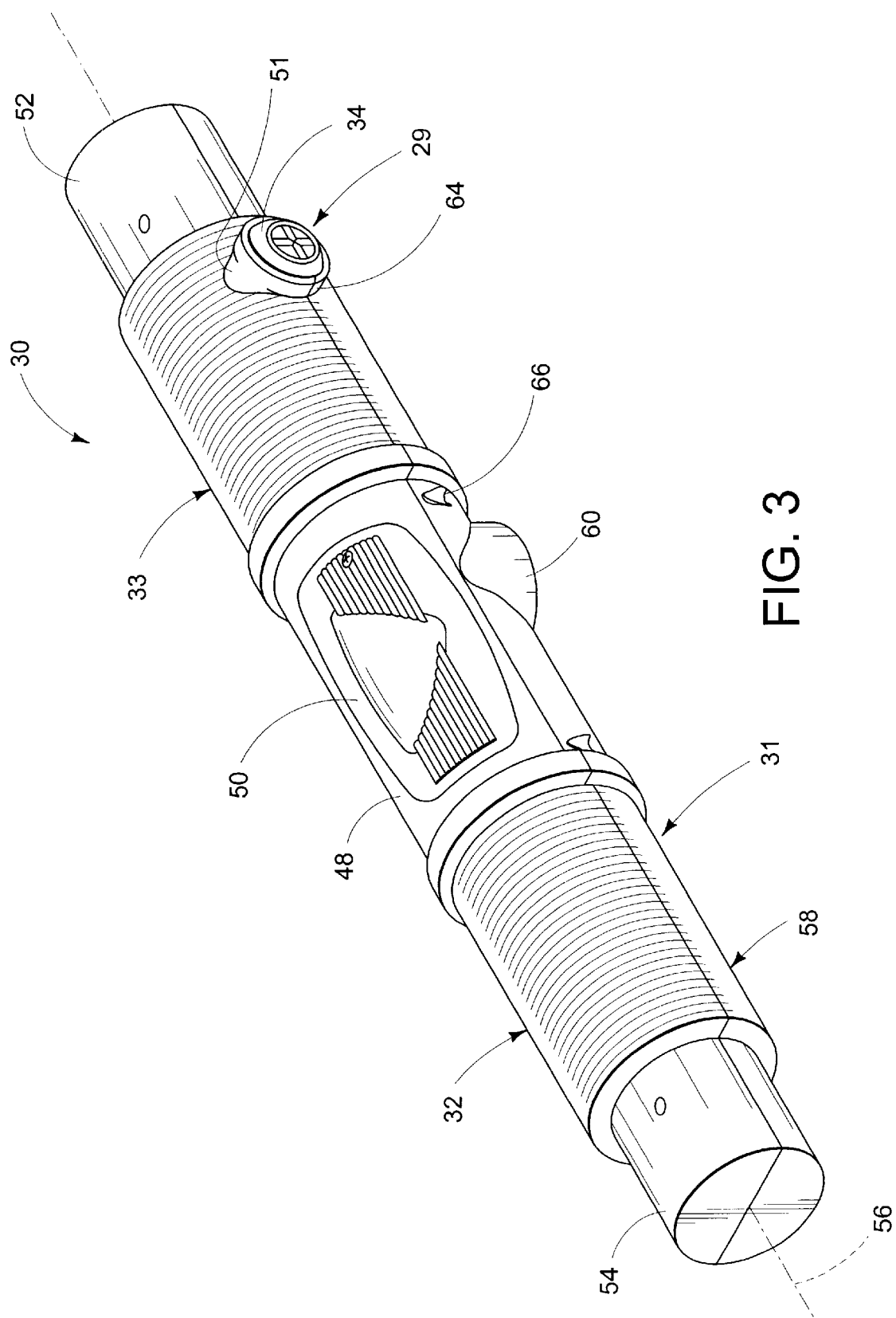
FIG. 3 is an isometric view from above of the audio-visual device of FIG. 1.

An example of such a switch, which may also be referred to as a user input device, is shown in FIGS. 2 and 3 in the form of button 34 that is operable by a child sitting on seat 16. The use of button 34 allows the child to trigger the emission of light and/or sound whenever desired by simply pressing the button. Button 34 may be positioned at any desired location on ride-on vehicle 10 accessible to a child sitting on seat 16. In the depicted embodiment, button 34 is positioned on audio-visual device 30 such that it is located above and to the side of steering wheel 19. This places the button within the field of vision of the child when the child is sitting on seat 16 and looking generally forward. In this position, the child may see and actuate the button without having to look away from oncoming objects when the vehicle is moving forward. In the illustrated embodiment, button 34 is positioned on device 30. It is within the scope of the invention that the button or other device alternatively may be located in a spaced-apart relationship from device 30, such as elsewhere on vehicle 10, while remaining in communication with the device so that actuation of the button causes actuation of device 30.

When the audio-visual device is adapted to emit light, it includes at least one light-emitting region. In the depicted embodiment, audio-visual device 30 has two light-emitting regions 32 and 33 disposed adjacent either end of the audio-visual device. It is within the scope of the invention that device 30 may have either more or fewer light-emitting regions. Light-emitting regions 32 and 33 are typically oriented such that they emit light away from a child sitting on seat 16. For example, in the illustrated embodiment, regions 32 and 33 are directed generally upward and forward of the vehicle's riding space 13. It is within the scope of the invention that vehicle 10 could include one or more audio-visual devices 30, and that these devices may alternatively, or additionally, be oriented to emit light laterally or rearward from the riding space. As mentioned above, audio-visual device 30 may be configured to be similar in appearance, i.e. shape and/or location and/or structural function, to a corresponding structural member of a full-sized vehicle to which ride-on vehicle 10 is designed to be similar in appearance. In the depicted embodiment, audio-visual device 30 takes the form of a horizontal cross-member that simulates the appearance of a horizontal roll-cage bar in a full-sized dune buggy. Thus, audio-visual device 30 has an elongate shape of a similar cross-sectional shape and diameter as the other frame members forming roll-cage structure 28, and extends between a first frame side section 36 and a second frame side section 38.

As shown in the illustrated embodiments, first and second frame side sections 36 and 38 are each formed from an interconnected network of frame members 26, and extend generally upwardly from base 14 generally from opposing sides of seat 16 to define at least a portion of riding space 13 around seat 16. First side section 36 includes a first top member 40, and second side section 38 includes a second top member 42. Audio-visual device 30 extends between first top member 40 and second top member 42 in such a manner as to maintain the first and second top members in a spaced-apart relationship to each other. Audio-visual device 30 connects to first and second top members 40 and 42 via connectors 44 and 46, which are disposed on the first and second top members. Connectors 44 and 46 are configured to accept complementary connectors on audio-visual device 30, which are described in more detail below.

Audio-visual device 30 may extend between first and second top members 40 and 42 at any desired location along the first and second top members. In the depicted embodiment, audio-visual device 30 extends between first and second top members 40 and 42 at a location generally forward of seat 16, and is oriented such that button 34 at least partially faces a child sitting in seat 16. This places button 34 in the field of vision of the child sitting on seat 16 when the child is looking forward, thus allowing the child to locate the button easily without having to look away from the front of the vehicle while driving.

While audio-visual device 30 is shown in the depicted embodiment as connecting first and second top members 40 and 42, it will be appreciated that audio-visual device 30 may be located elsewhere on the vehicle, such as between other frame members 26 or between one or more frame members 26 and base 14, or between other portions of body 12. Using the illustrated embodiment, namely a ride-on vehicle shaped to resemble a full-sized dune buggy, device 30 may replace members 40 or 42, the rear cross-member shown in FIG. 2, the generally vertical supporting frame members supporting members 40 and 42, etc. Accordingly, it should be understood that device 30 may take the form of any desired structural part of ride-on vehicle 10. Furthermore, audio-visual device 30 may comprise more than one frame member (or other structural member). In this sense, audio-visual device 30 can be viewed as a selectively actuable structural region of body 12 that emits at least one of a light and a sound when activated. If audio-visual device 30 comprises multiple frame members, the members may either be connected or unconnected, and may be activated by the same triggering device, or different triggering devices.

Device 30 includes a body 31 having one or more light emitting regions, such as regions 32 and 33, that upon actuation of triggering device 29 are configured either to produce light or to transmit light emitted from one or more light sources 77 within the interior of audio-visual device 30. The light-emitting regions may also include lens structure 35 that is adapted to refract or focus the light emitting from sources 77. It is within the scope of the invention, however, that regions 32 and 33 may also be entirely smooth so as not to appreciably refocus or direct the light transmitted therethrough. Preferably, body 31 further includes at least one opaque region through which light does not pass and which is oriented on device 30 so as to be oriented toward a child's eyes when the child is sitting on seat 16. Having an opaque region oriented in this manner prevents the light emitted from the device from shining in the child's eyes, which may impair the child's ability to see oncoming obstacles or to operate the vehicle. In the mounting configuration shown in FIG. 2, a suitable opaque surface is the bottom surface 58 of the audio-visual device.

Device 30 further includes a sound-generating assembly 39 with one or more speakers 78 that are adapted to emit sound upon actuation of triggering device 29, and a power supply 96 that powers the light- and/or sound-generating components of device 30. An example of a suitable power supply is one or more batteries, which may be, but are not necessarily, rechargeable. It is within the scope of the invention that audio-visual device 30 may be powered by any other suitable power supply, such as the battery assembly used to power the vehicle's motor assembly. Furthermore, and as discussed, it is within the scope of the present invention that audio-visual device 30 may be adapted to produce only light or sound, as opposed to both light and sound. In such an embodiment, it should be understood that the corresponding light- or sound-generating components of the device are not required.

Figure 4:
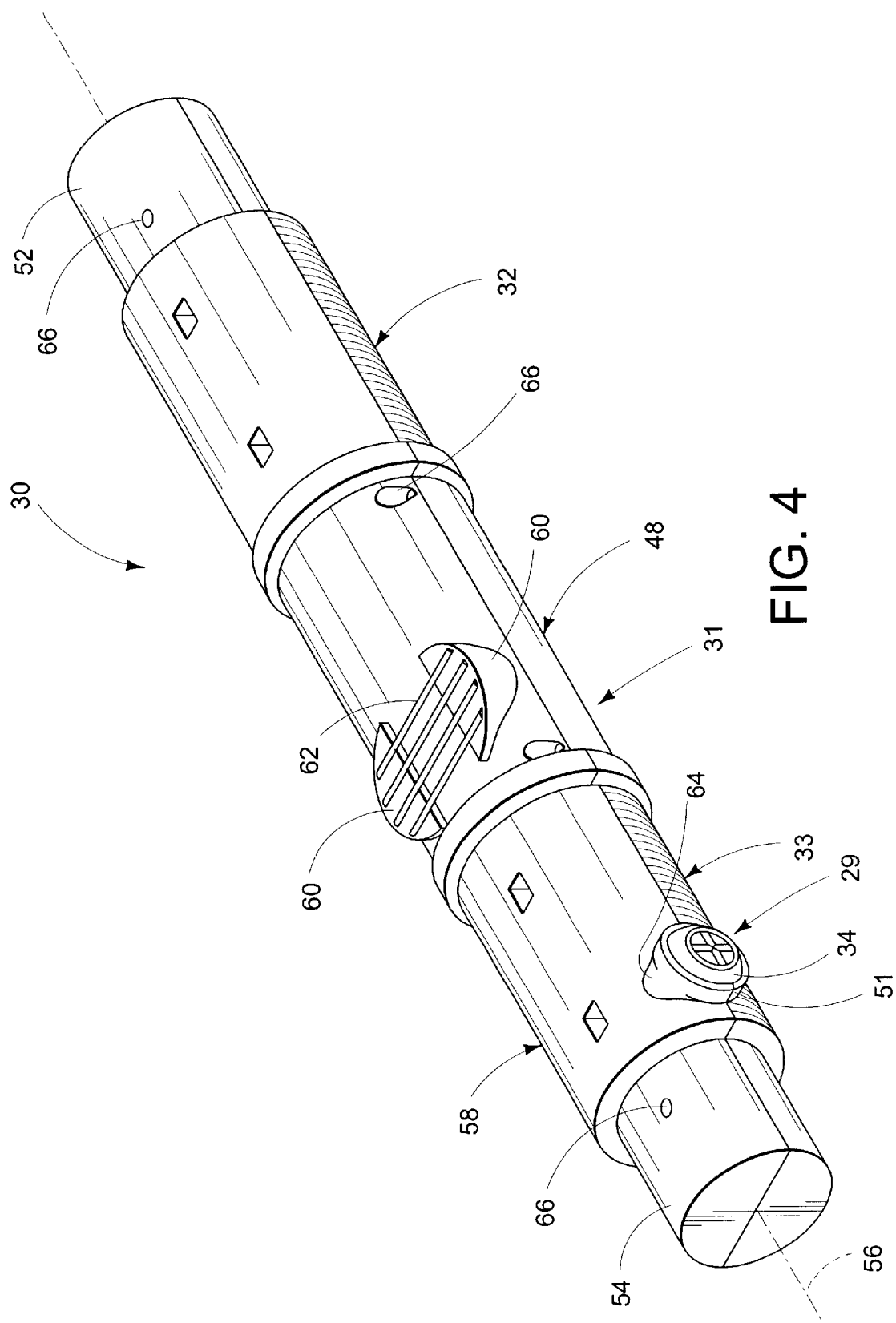
FIG. 4 is an isometric view from below of the audio-visual device of FIG. 3.
Figure 5:
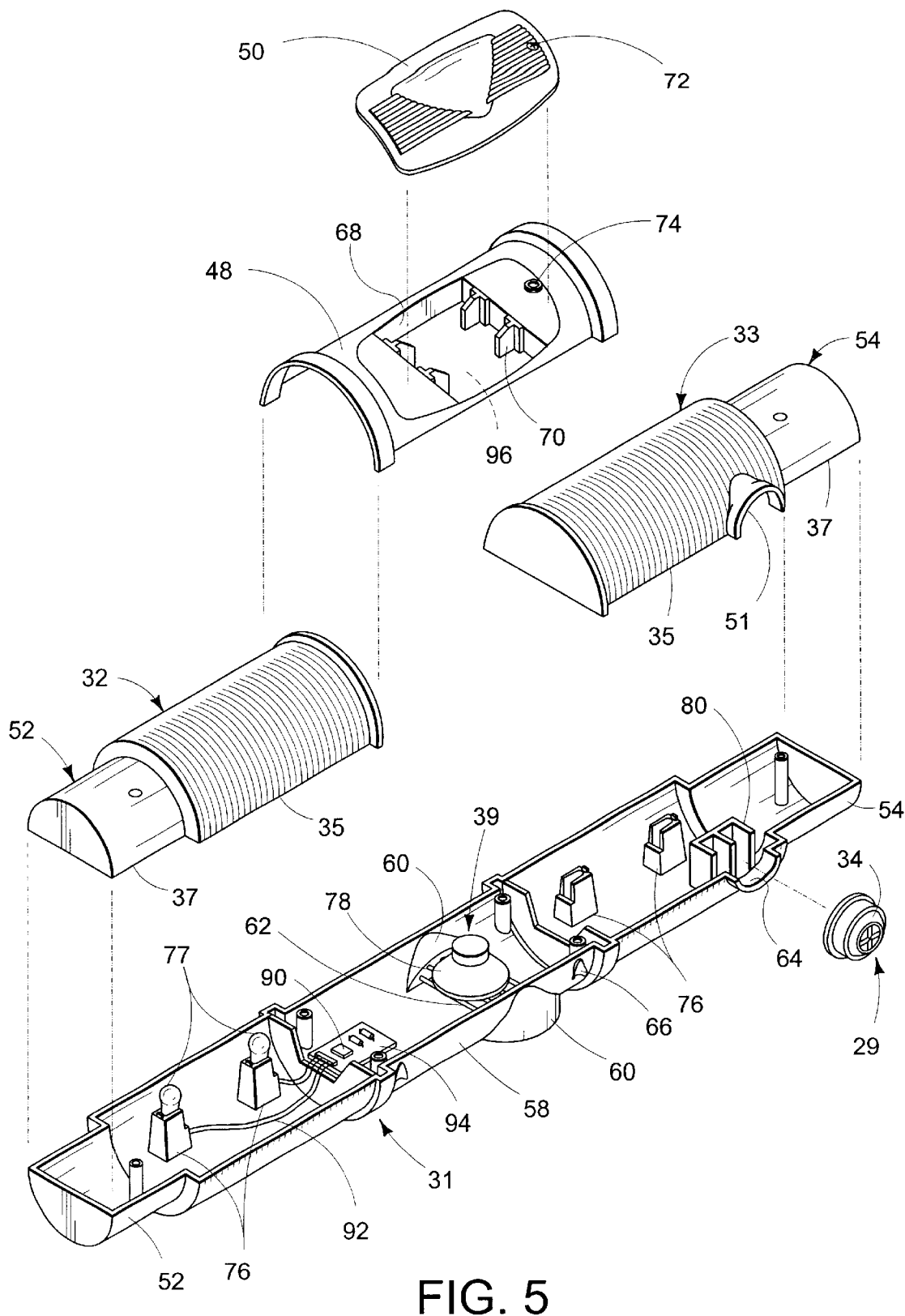
FIG. 5 is an exploded isometric view of the audio-visual device of FIG. 3.

An example of a suitable construction for audio-visual device 30 is shown in more detail in FIGS. 3–5. Referring first to FIG. 3, body 31 is shown being elongate, with light-emitting regions 32 and 33 disposed adjacent each end of the audio-visual device and a central region 48 disposed between the light-emitting regions. Central region 48 includes a mounting structure 70 that is adapted to receive power supply 96. As perhaps best seen in FIG. 5, region 48 includes a removable cover 50 to allow selective access to the interior of central region 48, such as access to power supply 96. Cover 50 may mount to central region 48 via any suitable fastening mechanism, such as via a snap-fit, removable fastener, or one or more tabs that fit underneath a lip formed around interior 68 of central region 48. It is within the scope of the invention that audio-visual device 30 may be powered by any other suitable power supply, such as the battery assembly used to power the vehicle's motor assembly. Also shown in FIGS. 4 and 5 is speaker mount 60 that is formed in a bottom portion 58 of body 31. As shown, portion 56 includes apertures 62 through which sound from speaker 78 is emitted through the body of device 30.

In FIGS. 3 and 5, light-emitting regions 32 and 33 are shown disposed on the upper portion of audio-visual device 30. In the depicted embodiment, light-emitting regions 32 and 33 are each formed from an elongate, semi-cylindrical shell made of a transparent or translucent material that transmits light emitted from a source within the interior of audio-visual device 30. As shown, light-emitting region 33 includes a molded semi-circular extension 51 to accommodate a triggering device 29, which is illustrated in the form of a button 34. However, button 34 or another suitable triggering device may be located elsewhere on device 30. Similarly, the speaker assembly and corresponding apertures may be located elsewhere on device 30, such as to emit sound in the same general direction as light sources 77 emit light. While light-emitting regions 32 and 33 of the depicted embodiment are formed from a single molded semi-cylindrical shell that is entirely translucent, light-emitting regions 32 and 33 each may be formed from more than one piece, may also include non-translucent portions, and may have a different shape and size without departing from the scope of the invention.

In the illustrated embodiment, an example of a suitable lens structure 35 is shown in FIGS. 3 and 5 in the form of a grooved outer surface forming part of regions 32 and 33. Other examples of suitable lens structures include a grooved, roughened, or otherwise shaped portion of the light emitting structure's inner surface. Furthermore, regions 37 of the lens structure provide an illustrated example of a region of the light emitting structures that may be either opaque so as not to transmit light therethrough, or which may be smooth and not configured to refocus or redirect the light transmitted therethrough.

FIG. 4 shows the underside of audio-visual device 30. When audio-visual device 30 is in place on ride-on vehicle 10, the underside, or bottom surface 58, of the audio-visual device faces generally downward and somewhat toward a child seated on seat 16. In such a mounting position, the underside of audio-visual device 30 is thus preferably formed from an opaque material so that audio-visual device 30 does not emit light in the direction of a child riding the vehicle. In the depicted embodiment, the underside of audio-visual device 30 is formed from an opaque, single-piece bottom 58. Bottom 58 includes a pair of opposing, generally semi-cylindrical protrusions forming speaker mount 60. Also shown are a plurality of slots forming apertures 62 to pass sound emitted by the speaker. Bottom 58 also includes an aperture 64 that is configured be complementary to a corresponding aperture in light-emitting region 33 to allow button 34 to extend through the body of the device. Furthermore, one or more apertures may be provided in bottom 58 to allow light-emitting regions 32, 33 and central region 48 to be attached to bottom 58 with suitable fasteners. Examples of these mounting apertures include recesses 66 shown in FIG. 4 and apertures 70 and 72 shown in FIG. 5.

In FIG. 5, light mounts 76 are shown configured to receive corresponding light sources 77. Light mounts 76 are positioned beneath light-emitting regions 32 and 33 and may be configured to hold any suitable light source, such as one or more light-emitting diodes. In the depicted embodiment, light mounts 76 are each adapted to hold a light source in the form of an incandescent bulb. It should be understood that the number of light sources and mounts therefor may vary from as few as one to many. When two or more light sources are used, device 30 may emit synchronized patterns of light by controlling the timing and frequency at which the respective light sources are actuated. In the depicted embodiment, two light mounts 76 are shown positioned under each of light-emitting regions 32 and 33. Also shown in FIG. 5 is a mount 80 for mounting an electrical contact (not shown) for button 34, although as discussed, any suitable triggering device and mechanism for communicating with light sources 77 may be used.

Device 30 may be coupled to body 12 by any suitable mechanism. For example, FIG. 3 shows examples of suitable connectors 52 and 54 for connecting audio-visual device 30 to first and second top members 40 and 42 of frame 20. The particular location of connectors 52 and 54 on audio-visual device 30 allows the audio-visual device to be connected to top members 40 and 42 in such a manner that the audio-visual device appears to be an integral part of the frame, rather than an appendage to the frame.

Connectors 52 and 54 are formed from extensions from each end of audio-visual device 30, and are positioned generally along a central axis 56 running through the length of audio-visual device 30. As illustrated, connectors 52 and 54 are narrower than the rest of audio-visual device 30 and are complementary in shape to mounts, such as recesses 55 formed in connectors 44 and 46. Thus, connectors 52 and 54 can be inserted into the complementary recesses, or other suitable mounts, in connectors 44 and 46 to secure audio-visual device 30 to the rest of ride-on vehicle 10. While the depicted connectors 52 and 54 have a cylindrical shape, it will be appreciated that the connectors may have any desired shape. Furthermore, while the extensions of connectors 52 and 54 of the depicted embodiment are disposed on the ends of audio-visual device 30, it will be appreciated that the extensions may instead be disposed on frame 20, and complementary recesses may be formed in audio-visual device 30. Furthermore, any other suitable connector that enables audio-visual device 30 to be coupled between portions of the vehicle's body may also be used.

Audio-visual device 30 may, but does not necessarily, include a controller 90 for controlling the emission of light and sound responsive to inputs associated with triggering events, such as user-inputs to triggering devices 29. Each light mount 76 is electrically coupled to controller 90 by any suitable structure, such as with one or more wires 92. Wires 92 are shown extending from controller 90 to two of the light mounts; the wires to the other two light mounts are being omitted from the illustration to provide a less obstructed view of the corresponding portion of device 30 underlying the wires. Speaker 78 and button 34 are also electrically coupled to controller 90 via any suitable structure, such as wires, which have also been omitted from the illustration for clarity.

Controller 90 may include any suitable structure that is configured to accept an input from button 34 (or other triggering event or device) and to cause the emission of light and/or sound from audio-visual device 30. For example, controller 90 may be a computerized controller. As shown in FIG. 5, controller 90 may be mounted on a circuit board 94. Other electronics besides controller 90, such as an amplifier to drive speaker 78, may also be mounted on circuit board 94.

Controller 90 may be configured to cause any desired pattern of light or sound to be emitted. For example, in the simplest case, controller 90 may be configured to cause the emission of a single pulse of light of a fixed duration, or the emission of a single frequency of sound for a fixed duration. Alternatively, controller 90 may be configured to cause the emission of patterns of light and/or sound. For example, controller 90 may be configured to cause each light source 77 to flash on sequentially relative to the others, or to cause each light source to flash on and off multiple times, either synchronously or asynchronously with the other light sources. Similarly, the controller may cause patterns of light and sound to be emitted together.

Figure 6:
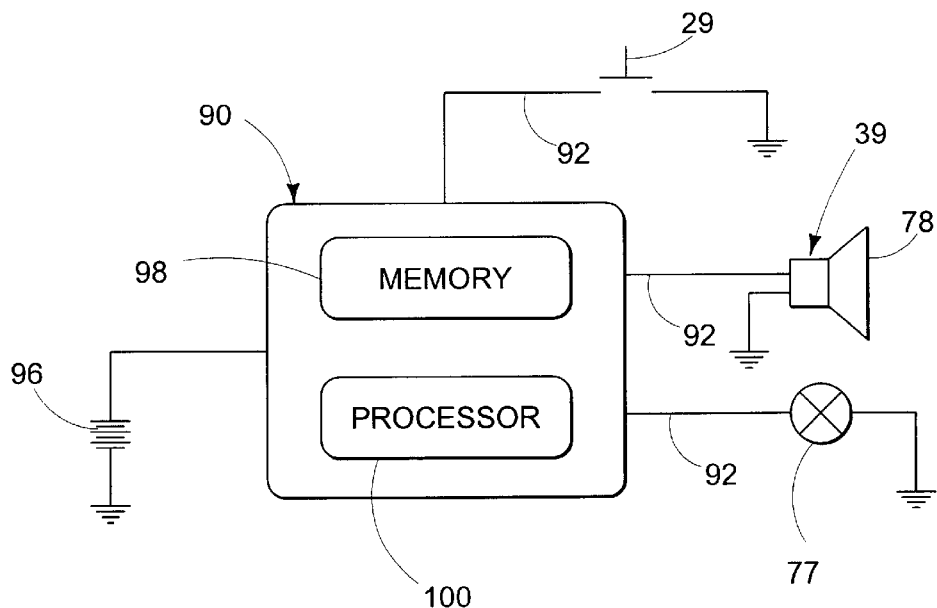
FIG. 6 is a block diagram of suitable electronics for use with the audio-visual device of FIG. 3.

FIG. 6 shows a schematic diagram of suitable electronics for controlling audio-visual device 30, although it should be understood that is within the scope of the invention that any suitable electronics may be used. In the illustrated embodiment, controller 90 is powered by power supply 96, and includes memory 98 in which one or more patterns of light and/or a plurality of sounds may be stored, and a processor 100. Memory 98 may include both ROM and RAM, and may also include erasable or programmable memory such as EPROM, EEPROM and flash memory. The use of erasable/programmable memory allows new sounds and/or light patterns to be written into memory 98 when desired, and also allows the removal of old patterns. Generally, controller 90 will have sufficient memory to store a plurality of light patterns and a plurality of sounds or sound patterns. In this situation, controller 90 may be configured, when an input is received from button 34 (or other triggering device), to select a preselected or random pattern of light and/or a preselected or random sound from memory 98, and then to cause the patterns of light and/or sound to be emitted by light source 77 and speaker 78. Where a random pattern of light and a random sound are emitted together, controller may either select the random pattern of light and the random sound separately, or may select a random paired light-sound pattern.

Figure 7:
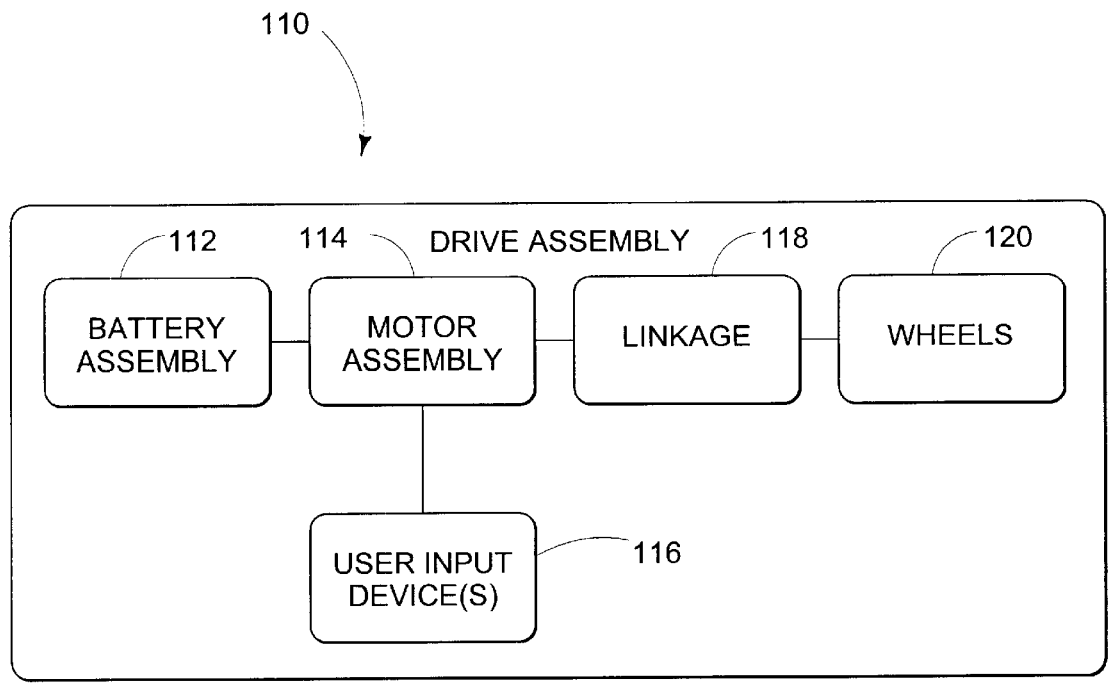
FIG. 7 is a block diagram of a suitable drive assembly for the vehicle of FIG. 1.

As discussed above, ride-on vehicle 10 includes various other components that allow the vehicle to be driven by a child. For example, ride-on vehicle 10 includes a drive assembly 110 that enables ground-traveling movement and steering of the vehicle. FIG. 7 shows a block diagram of a suitable drive assembly for ride-on vehicle 10. Drive assembly 110 includes a battery assembly 112 having one or more batteries for providing power to a motor assembly 114 containing one or more motors. The batteries are typically rechargeable batteries, but may be another type of battery if desired. Six- and twelve-volt batteries have proven effective, but other types of batteries may be used.

Drive assembly 110 typically includes one or more user input devices 116 that allow a child sitting on seat 16 to control at least one of the speed and direction at which the vehicle is driven. Examples of suitable user input devices include a directional control to switch the motor assembly between forward and backward rotation, an on/off mechanism such as a button or simulated gas pedal to actuate the delivery of power to the motor assembly, and/or to control the select different driving speeds for the vehicle. An example of a suitable speed control is a switch that selectively configures two or more motors and/or two or more batteries between series and parallel configurations. Another suitable speed control is a lever, throttle, pedal or other switch that regulates the delivery of power to motor assembly 114 responsive to the relative position of the control within a defined range of positions.

Motor assembly 114 is adapted to drive the rotation of one or more of the vehicle's wheels 18, which as such may be referred to as driven wheels. At least one of the driven wheels may also be steerable wheels, or the steerable and driven wheels may be separate wheels. It is within the scope of the invention that the output of the motor assembly may directly engage one or more of the wheels. Typically, the motor assembly will be coupled to the driven wheels with a suitable linkage 118 that rotationally couples the motor assembly's output to one or more of the wheels. Examples of suitable linkages 118 include a belt drive, a worm gear, a gearbox containing one or more interconnected gears, etc.

While a battery-powered, motorized drive assembly has been described above and illustrated in FIG. 7, it should be understood that other drive assemblies may be used and are within the scope of the present invention. For example, vehicle 10 may include pedals that, upon pedaling by a child sitting on seat 16, are adapted to drive at least one of wheels 18 to cause driven ground-traveling motion of the vehicle. Another suitable drive assembly is for the vehicle's body to include an aperture through which a child's legs may extend and reach a ground surface when the child is sitting on seat 16. This configuration is referred to as a "foot-to-floor" configuration, in that the child propels the vehicle by pushing against a ground surface with the child's feet.

While the present invention has been particularly shown and described with reference to the foregoing depicted embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. Where the claims recite "a" or "a first" element or the equivalent thereof, such claims should be understood to include incorporation of one or more such elements, neither requiring nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of those claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A ride-on vehicle for children, comprising:
   a body with a seat;
   a plurality of wheels rotatably coupled to the body; and
   a frame forming a portion of the body and including a plurality of interconnected frame members, wherein the plurality of interconnected frame members include at least a first frame member, a second frame member spaced-apart from the first frame member, and a third frame member that comprises an audio-visual device configured to emit at least one of a light and a sound upon the occurrence of a triggering event, the audio-visual device having first and second opposing ends, each opposing end being connected to a respective one of the first and the second frame members such that the audio-visual device forms a portion of the third frame member and maintains the first and the second frame members in a spaced-apart relationship.

2. The ride-on vehicle of claim 1, further comprising a triggering device operable by a child sitting in the seat to cause the audio-visual device to emit at least one of the light and the sound.

3. The ride-on vehicle of claim 2, wherein the triggering device includes a button that causes the audio-visual device to emit at least one of the light and the sound when operated.

4. The ride-on vehicle of claim 2, wherein the triggering device is disposed on the audio-visual device.

5. The ride-on vehicle of claim 1, wherein the audio-visual device includes a light-emitting region disposed adjacent one of the opposing ends of the audio-visual device.

6. The ride-on vehicle of claim 1, wherein the audio-visual device includes at least two light-emitting regions and a central region disposed between the light-emitting regions, the central region being adapted to receive a power supply for powering the audio-visual device.

7. The ride-on vehicle of claim 6, wherein the central region includes a speaker configured to emit the sound upon the occurrence of the triggering event.

8. The ride-on vehicle of claim 1, further comprising a connector coupled to each of the first and the second opposing ends of the audio-visual device for connecting the audio-visual device to the first and the second frame members.

9. The vehicle of claim 8, wherein the connectors include extensions respectively extending from the first and the second opposing ends of the audio-visual device and being configured to engage complementary connectors on the first and the second frame members.

10. The ride-on vehicle of claim 9, wherein each extension includes a narrowed region configured to fit within a receptor on the complementary connector.

11. The vehicle of claim 9, wherein the complimentary connectors include recesses formed in the first and the second frame members.

12. The vehicle of claim 8, wherein each connector is located generally along a central axis of the audio-visual device.

13. The vehicle of claim 8, wherein the connectors include extensions extending from the first and the second frame members and adapted to engage a complementary connector on the first and the second opposing ends of the audio-visual device.

14. The vehicle of claim 13, wherein the complimentary connectors include recesses formed in the first and the second opposing ends of the audio-visual device.

15. The vehicle of claim 13, wherein each extension includes a narrowed region configured to fit within a receptor on the complimentary connector.

16. The ride-on vehicle of claim 1, further comprising a controller with memory, wherein the memory contains a plurality of stored sounds, and further wherein the sound is selected from the plurality of stored sounds.

17. The ride-on vehicle of claim 16, wherein the sound is selected at random from the plurality of stored sounds.

18. The ride-on vehicle of claim 1, further comprising a controller with memory, wherein the memory contains a plurality of stored light patterns, and further wherein the light emitted is a pattern of light selected from the plurality of stored light patterns.

19. The ride-on vehicle of claim 18, wherein the pattern of light is selected at random from the plurality of stored light patterns.

20. The ride-on vehicle of claim 18, the memory containing a plurality of stored sounds, each sound paired with a stored light pattern, wherein the audio-visual device emits a paired light-sound combination upon the occurrence of the triggering event, the paired light-sound combination comprising a pattern of light and a sound selected from the plurality of stored sounds and the plurality of stored light patterns.

21. A ride-on vehicle for children, comprising;
   a body with a seat configured to support a child riding the vehicle, the seat having a first side and a second side;
   a plurality of wheels rotatably coupled to the body;
   a frame forming part of the body, the frame including a first side section extending upwardly adjacent the first side of the seat, a second side section extending upwardly adjacent the second side of the seat, and an audio-visual device extending between the first side section and the second side section to connect the first side section and the second side section, wherein the audio-visual device is configured to emit one of a light and a sound upon the occurrence of a triggering event, wherein the audio-visual device has an elongate shape with a central axis, a pair of opposing ends; and
   a connector disposed on each of the opposing ends of the audio-visual device, wherein each connector is configured to connect to a complementary connector on one of the first side section and the second side section.

22. The ride-on vehicle of claim 21, wherein the audio-visual device extends between the first and second side sections in front of the seat.

23. The ride-on vehicle of claim 22, further comprising a user input device disposed on the body in a location operable by a child sitting in the seat, the user input device being configured to provide the triggering event when operated.

24. The ride-on vehicle of claim 23, wherein the user input device includes a button configured to trigger the emission of at least one of the light and the sound when depressed.

25. The ride-on vehicle of claim 23, wherein the user input device at least partially faces a child sitting in the seat.

26. The ride-on vehicle of claim 21, wherein the audio-visual device includes a light-emitting portion configured to emit light upon the occurrence of the triggering event.

27. The ride-on vehicle of claim 26, wherein the light-emitting portion faces away from the seat.

28. The ride-on vehicle of claim 26, the audio-visual device including a pair of opposing ends and at least two light-emitting portions, wherein one light-emitting portion is disposed adjacent each end of the audio-visual device.

29. The ride-on vehicle of claim 26, wherein the audio-visual device includes a speaker adapted to emit sound upon the occurrence of the triggering event.

30. The ride-on vehicle of claim 21, wherein each connector includes a narrowed extension extending from one of the opposing ends of the audio-visual device.

31. The ride-on vehicle of claim 30, wherein each connector is located generally along the central axis of the audio-visual device.

32. The ride-on vehicle of claim 21, wherein each connector includes a narrowed extension extending from a respective one of the first and the second side sections.

33. A ride-on vehicle for children, comprising:

a body with a seat;

a plurality of wheels rotatably coupled to the body; and a frame forming a portion of the body and including a plurality of interconnected frame members, at least one of the frame members comprising an audio-visual device configured to emit at least one of a light and a sound upon the occurrence of a triggering event, the audio-visual device having opposing ends, each opposing end being connected to other frame members such that the audio visual device forms a portion of the frame and maintains the other frame members in a spaced-apart relationship, wherein the audio-visual device further comprises a controller with memory, wherein the memory contains a plurality of stored light patterns and sounds, wherein each sound is paired with a stored light pattern, and further wherein the audio-visual device emits a paired light-sound combination upon the occurrence of the triggering event, the paired light-sound combination comprising a pattern of light and a sound selected from the plurality of stored sounds and the plurality of stored light patterns.

34. The ride-on vehicle of claim 33, further comprising a triggering device operable by a child sitting in the seat to cause the audio-visual device to emit at least one of the light and the sound.

35. The ride-on vehicle of claim 33, wherein the audio-visual device is configured to emit both a light and a sound upon occurrence of the triggering event.

36. A ride-on vehicle for children, comprising:

a body with a seat;

a plurality of wheels rotatably coupled to the body;

a frame forming a portion of the body and including a plurality of interconnected frame members, at least one of the frame members comprising an audio-visual device configured to emit at least one of a light and a sound upon the occurrence of a triggering event, the audio-visual device having opposing ends, each opposing end being connected to other frame members such that the audio-visual device forms a portion of the frame and maintains the other frame members in a spaced-apart relationship; and a connector disposed on each of the opposing ends of the audio-visual device for connecting the audio-visual device to the other frame members, the connector including an extension extending from the end of the audio-visual device, the extension being configured to engage a complementary connector on the other frame members.

37. The ride-on vehicle of claim 36, further comprising a triggering device operable by a child sitting in the seat to cause the audio-visual device to emit at least one of the light and the sound.

* * * * *